(12) United States Patent
Pfauch et al.

(10) Patent No.: US 12,736,377 B2
(45) Date of Patent: Sep. 15, 2026

(54) MODULAR FITTING FOR IMMERSION IN A MEDIUM AND METHOD FOR ASSEMBLING THE SAME

(71) Applicant: Endress+Hauser Conducta GmbH+Co. KG, Gerlingen (DE)

(72) Inventors: Thomas Pfauch, Leipzig (DE); Ingrid Wunderlich, Radebeul (DE); Lars Massalski, Leipzig (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 321 days.

(21) Appl. No.: 18/673,610

(22) Filed: May 24, 2024

(65) Prior Publication Data

US 2024/0393149 A1 Nov. 28, 2024

(30) Foreign Application Priority Data

May 25, 2023 (DE) ..................... 10 2023 113 840.5

(51) Int. Cl.

| | |
|---|---|
| ***G01D 11/30*** | (2006.01) |
| ***F16L 19/02*** | (2006.01) |
| ***G01D 11/00*** | (2006.01) |
| ***G01D 11/24*** | (2006.01) |
| ***G01D 21/00*** | (2006.01) |

(52) U.S. Cl.
CPC .............. *G01D 11/30* (2013.01); *F16L 19/02* (2013.01); *G01D 11/00* (2013.01); *G01D 11/24* (2013.01); *G01D 21/00* (2013.01)

(58) Field of Classification Search
CPC ........ G01D 11/30; G01D 11/24; G01D 11/00; G01D 21/00; F16L 19/02
USPC .............................................. 73/53.01, 64.55
See application file for complete search history.

(56) References Cited

U.S. PATENT DOCUMENTS 4,177,676 A * 12/1979 Welker ...................... G01F 1/10 73/866.5
2009/0120169 A1* 5/2009 Chandler, Jr. ......... G01N 11/16 29/25.35
2021/0359680 A1* 11/2021 Nakayama ............... H05K 5/06

FOREIGN PATENT DOCUMENTS

DE 202015107162 U1 4/2017

OTHER PUBLICATIONS

Excerpt of product catalogue, Josef Schlemmer GmbH, p. 18.

* cited by examiner

*Primary Examiner* — Peter J Macchiarolo
*Assistant Examiner* — John M Royston
(74) *Attorney, Agent, or Firm* — Christopher R. Powers; Endress+Hauser (USA) Holding, Inc.

(57) ABSTRACT

A modular fitting for immersion in a medium includes: a cylindrical fitting tube configured to accommodate a sensor as to enable contact with the medium at a first end, wherein at the first end a protective basket with at least two tines is arranged; a crown nut including an external thread and at least two slots; a ring; and a cylindrical fitting base including an internal thread complementary to the external thread of the crown nut at a first end region of the fitting base and a stop at a second end region of the fitting base, wherein the ring is configured to be slipped over a cable connected to the sensor, wherein the fitting base is configured to accommodate and fix the ring via the crown nut, and wherein the fitting base and the fitting tube each comprise connecting means to releasably connect them securely to each other.

17 Claims, 4 Drawing Sheets

MODULAR FITTING FOR IMMERSION IN A MEDIUM AND METHOD FOR ASSEMBLING THE SAME

The present application is related to and claims the priority benefit of German Patent Application No. 10 2023 113 840.5, filed May 25, 2023, the entire contents of which are incorporated herein by reference.

TECHNICAL FIELD

The invention relates to a modular fitting for immersion in a medium and a method for assembling the same.

BACKGROUND

Apart from measurements with permanently installed fittings in tanks (e.g., fittings with designations CPA510 or CPA111 of Applicant) and fittings for open basins or channels (e.g., fittings with designation CYA112 of Applicant), which are continuously in use, short-term and short-time measurements with transportable sensors, measuring transducers and fittings also play an ever greater role. These take place in periods of minutes to a few hours. Parameters of the liquid analysis, e.g., pH, conductivity, or dissolved oxygen, are frequently measured on streams, fish farms, sewage treatment plants or open containers.

There is a need for a fitting that is transportable, easy to place in operation, and easy to clean and without the need for weights.

SUMMARY

The invention is based on the object of proposing a fitting which is transportable, easy to place in operation, and easy to clean. It is also to be possible to dispense with the need for weights.

The object is achieved by a modular fitting according to the present disclosure, which is assembled according to the present disclosure. Specifically, the object is achieved by a modularly designed fitting for immersion in a medium, comprising a hollow-cylindrical fitting tube, which is designed to accommodate a sensor, such that said sensor has contact with the medium by a sensitive element on a first end region of the fitting tube, wherein the fitting tube at the first end region comprises a protective basket with teeth, in particular with two, preferably four, five or six, tines, a crown nut having an external thread and at least two, preferably four, five or six, slots; a ring element, and a hollow-cylindrical fitting base with an internal thread corresponding to the external thread of the crown nut at the first end region of the fitting base and a stop at the second end region of the fitting base, wherein the ring element is designed to be slipped over an end region of a cable, wherein the cable can be connected to the sensor, wherein the fitting base is designed to accommodate the ring element and to fix it by the crown nut, and wherein the fitting base and the fitting tube each comprise connecting means, in particular threads, in order to releasably them to one another.

One embodiment provides that the fitting comprises the sensor.

One embodiment provides that the fitting comprises the cable.

One embodiment provides that the ring element comprises an axial slot.

One embodiment provides that the ring element comprises a first positive-locking element and the fitting base comprises a positive-locking element complementary thereto, wherein they prevent the ring element from rotating relative to the fitting base.

One embodiment provides that the ring element comprises a second positive-locking element and the cable comprises a positive-locking element complementary thereto, wherein they prevent the cable from rotating relative to the ring element.

One embodiment provides that the fitting tube comprises one or more openings at the first end region.

One embodiment provides that the teeth of the fitting tube and the slots of the crown nut are designed to correspond and the crown nut is screwed into the fitting base by means of the fitting tube with the teeth.

One embodiment provides that the fitting tube is designed in two parts and the two parts each comprise connecting means, in particular threads, in order to connect them to one another releasably.

One embodiment provides that the fitting tube comprises in the interior a seal, which, when the sensor is installed, encloses it and prevents medium from getting the interior of the fitting tube.

One embodiment provides that the protective basket is arranged in the first part and the seal is arranged in the second part.

One embodiment provides that the fitting base comprises one or more bores or eyelets in the region of the stop.

The object is further achieved by a method for assembling a fitting as described above comprising the steps of: slipping the ring element over the cable; passing the cable through the fitting base and inserting the ring element into the fitting base; inserting the crown nut into the fitting base and screwing it in until the ring element abuts against the stop of the fitting base; connecting the sensor to the cable; and connecting the fitting tube to the fitting base.

The claimed fitting thus solves the object shown by being completely removable. The cable is completely detachable from the fitting, or is separated from the fitting. The individual parts, for example plastic parts, can thus be easily cleaned, for example by means of a brush or even by means of a dishwasher. By means of the direction-oriented installation by positive locking, a marking of the "open/closed" position of the cable relative to the body is possible.

The removal is done manually. The only required tool is integrated into the sensor protection basket (see below). The plastic parts have a density, for example, which is >1 g/cm$^3$. Air spaces are avoided with the fitting, whereby additional weights become unnecessary.

BRIEF DESCRIPTION OF THE DRAWINGS

The present disclosure is described in more detail with reference to the following figures.

In the figures, the same features are labeled with the same reference signs.

DETAILED DESCRIPTION

Figure 1A:
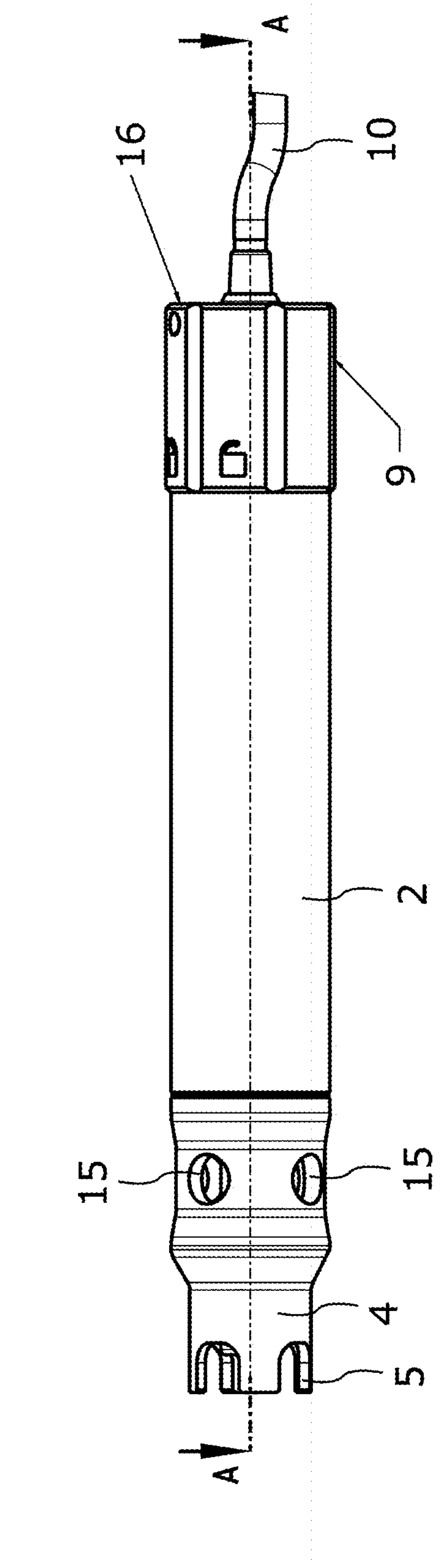
FIG. 1*a* shows a side view of a fitting according to the present disclosure in the assembled state.

The claimed fitting in its entirety is reference sign 1 and is shown in FIG. 1*a*.

The fitting 1 comprises a hollow-cylindrical fitting tube 2 which is designed to accommodate a sensor 3 so that a sensitive element 3*a* on a first end region of the fitting tube 2 has contact with a medium to be measured by the sensor 3. At the first end region, the fitting tube 2 comprises a protective basket 4 with teeth 5, in particular, with two, four, five or six, tooth-shaped elements, which ensure both a supply of medium to the sensor 3 and the necessary mechanical stability. In the following, "tines" is used interchangeably for teeth 5. The teeth 5 are only in the front region (in the figure to the left, i.e., facing the medium) so that the protective basket 4 is designed to be mechanically stable in order to be used as a tool (as described below).

Figure 2:
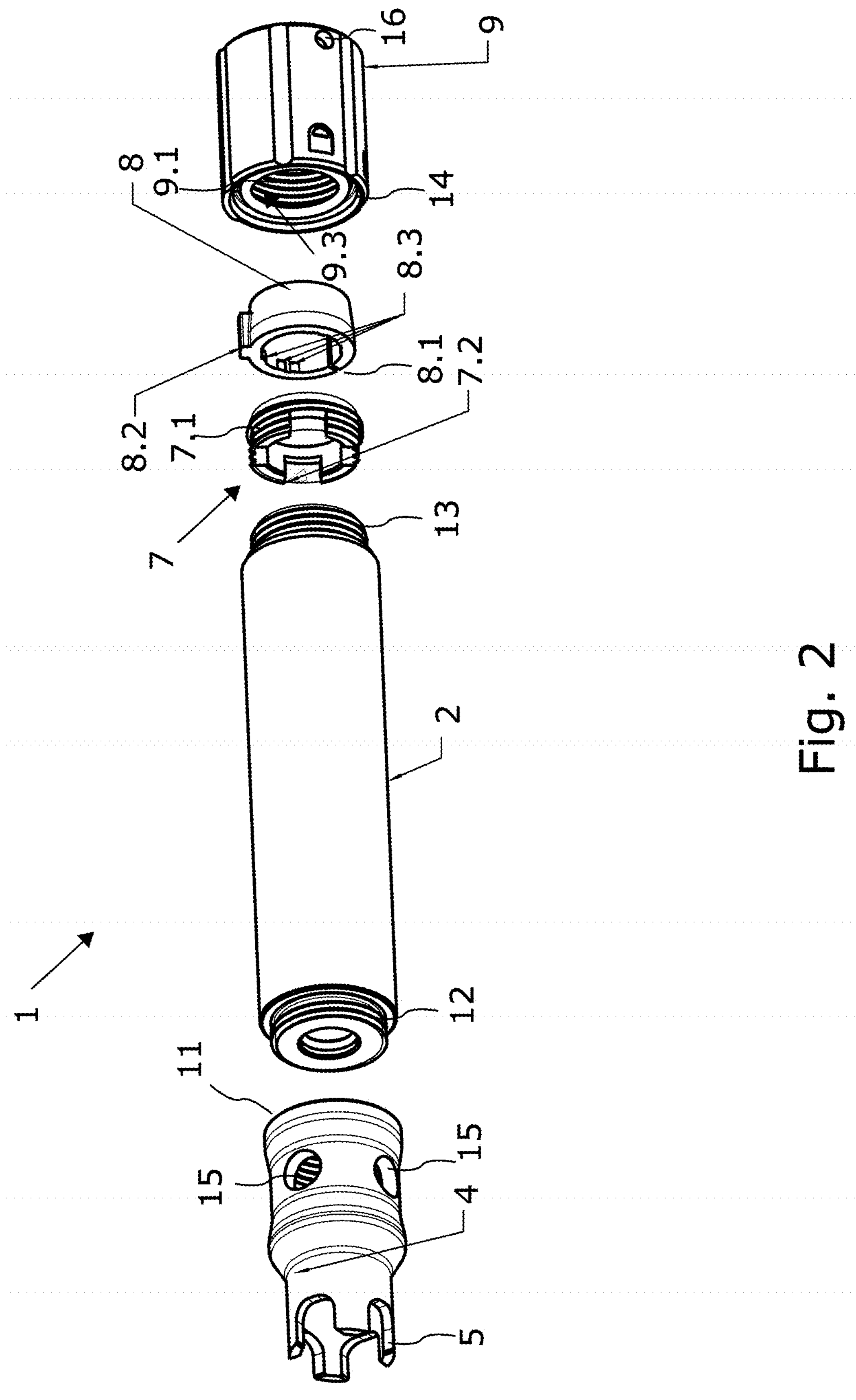
FIG. 2 shows an exploded, perspective view of the fitting of FIG. 1*a;*

The fitting tube 2 and the protective basket 4 may be designed in two parts (see FIG. 2 in the exploded-view drawing). For this purpose, the two parts each comprise connecting means, in this case, the complementary threads 11, 12, in order to releasably connect them to one another.

The sensor 3 can be designed, for example, as an ion-sensitive sensor, in particular, a pH sensor, conductivity sensor, temperature sensor, or oxygen sensor. In general, the sensor 3 serves to determine a measured variable. For this purpose, the sensor usually comprises at least one sensitive element 3*a* for detecting a measured value of process automation. The sensor 3 is thereby placed in the medium to be measured with the sensor element 3*a*.

The fitting 1 comprises seals, for example, a seal 6 in the interior of the fitting tube 2, which encloses (e.g., encircles, surrounds) the sensor 3 in assembly and prevents medium from entering the interior of the fitting tube 2. In the two-part design, the seal 6 is arranged in the fitting tube 2. In one alternative, the seal 6 is omitted and instead an O-ring with pressure ring is substituted to seal the sensor 3.

Figure 1B:
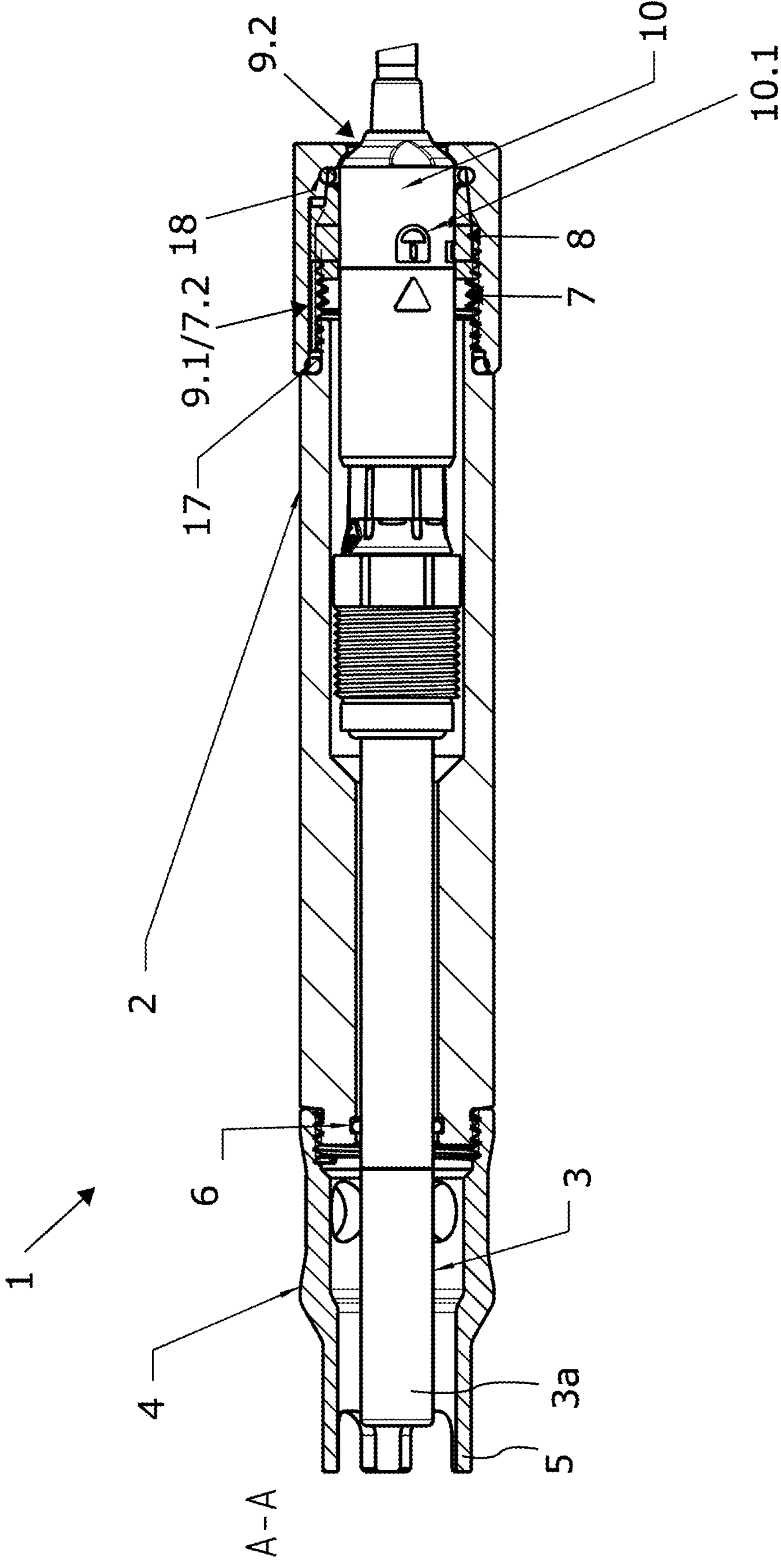
FIG. 1*b* shows the fitting of FIG. 1*a* in cross-section at line A-A.

In the case of a sensor 3 with a cap, such as a replaceable cap, for example, in the case of an oxygen sensor, the region of the cap is closer to the medium than the seal 6 when the sensor is installed. In the example in FIG. 1*b*, the seal is thus further to the right; the cap is indicated by the vertical line. The fitting tube 2 comprises one or more openings 15 at the first end region. During installation/removal of the sensor 3, this ensures that the cap is not inadvertently unscrewed.

The internal diameter of the fitting 1 is, for example, 20 mm, in any case such that the installed sensor 3 finds space therein and is correspondingly sealed.

Furthermore, the fitting 1 comprises the seals 17, 18 (see, for example, the cross-section along the line A-A in FIG. 1*b*), which prevent medium from getting into the interior on the opposite end. The seal 17 seals the fitting base 9 (as described below) relative to the fitting tube 2 or the crown nut 7; the seal 18 seals a cable 10 relative to the fitting base 9.

The cable 10 is designed to connect the sensor 3 to a transmitter (not shown). Sensor 3 and cable 10 are connected to each other via a bayonet lock. Screw connections or other types of connection are possible and within the scope of the present disclosure.

The fitting 1 comprises the aforementioned crown nut 7, which comprises an external thread 7.1. The crown nut 7 has at least two, preferably four, five or six, slots 7.2. The teeth 5 of the fitting tube 2 and the slots 7.2 of the crown nut 7 are designed to correspond. By means of the fitting tube 2, that is to say with the teeth 5 which engage in the slots 7.2, the crown nut 7 can be screwed into the fitting base 9 via the threads 7.1, 9.1.

The fitting 1 comprises a ring element 8. The ring element 8 comprises an axial slot 8.1 (i.e., along the longitudinal axis of the ring). The ring element 8 is introduced over the cable 10. By means of the slot 8.1, the ring 8 can easily be bent open in order to be more easily slipped over the cable 10. See FIG. 3*a* in this regard. The ring 8 is slipped over the cable 10 up to a stop on the cable 10. The ring element 8 is slightly conical in order to facilitate introduction into the fitting base 9. Because a suitably conical bore is also in the fitting base 9, the ring element 8 is compressed when the crown nut 7 is then screwed together. The slot 8.1 in the ring element 8 can thereby no longer widen and release the cable 10 without destroying the positive-locking elements 8.3. The positive locking is reliably ensured.

Figures 3A, 3B:
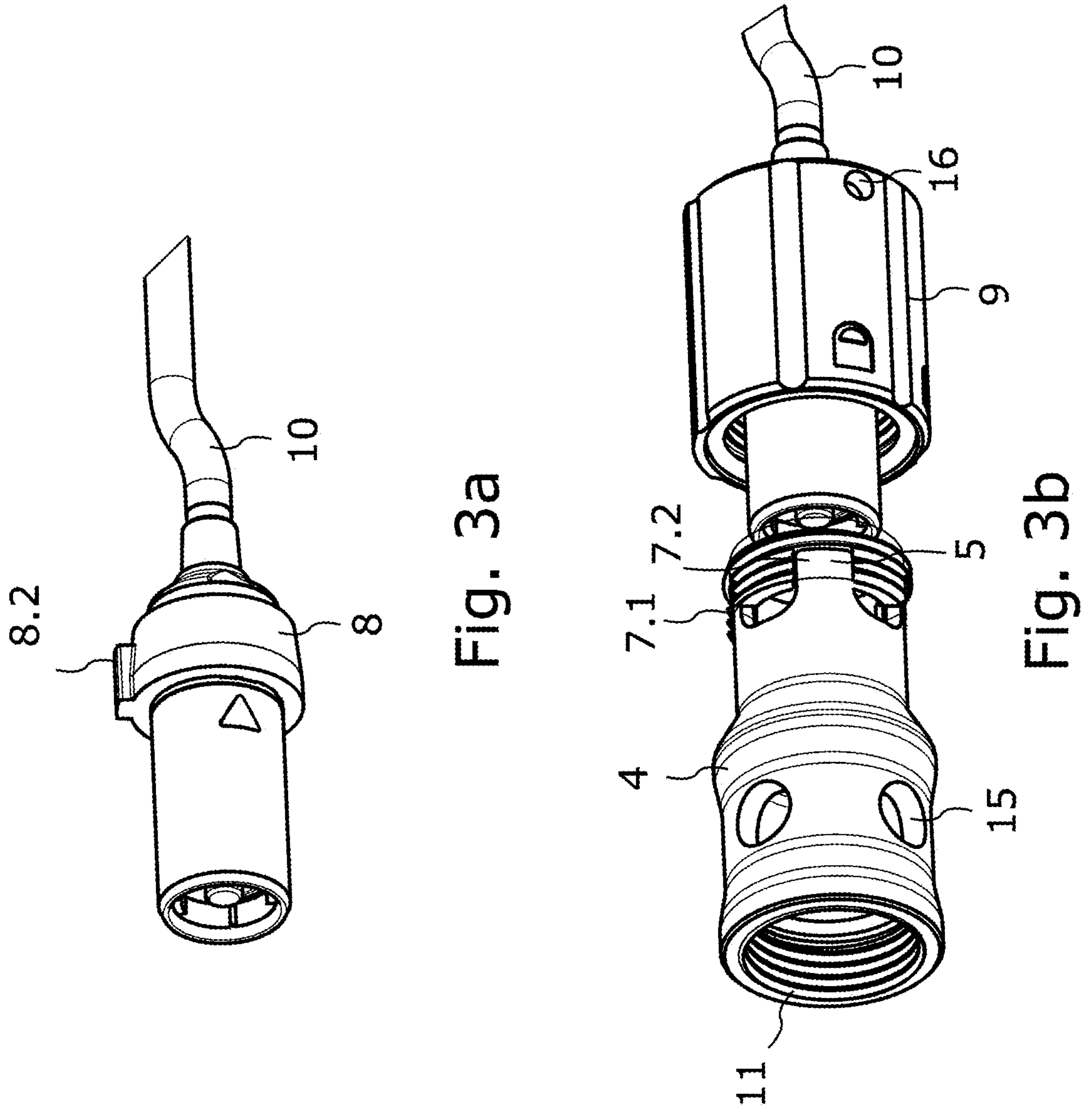
FIG. 3*a* shows a perspective view of a cable with ring element according to the present disclosure.
FIG. 3*b* shows a perspective view of a partial assembly situation.

The aforementioned hollow cylindrical fitting base 9 completes the fitting 1. The fitting base 9 comprises the internal threads 9.1, corresponding and complementary to the external thread 7.1 of the crown nut 7 at a first end region of the fitting base 9, and a stop 9.2 at a second end region of the fitting base 9. The fitting base 9 is thus designed to accommodate the ring element 8, wherein the ring element 9 is ultimately fixed to the cable 10 by the crown nut 7. The teeth 5 of the protective basket 4/fitting tube 2 are used as a tool for screwing. This is shown in FIG. 3*b*.

The fitting base 9 comprises one or more bores 16 or eyelets in the region of the stop 9.2. The fitting 1 can be suspended thereon or fastened thereto. The bores 16 thus also serve as strain relief for the cable 10.

The ring element 8 comprises a first positive-locking element 8.2 on the outside, and the fitting base 9 includes a positive-locking element 9.3 complementary thereto, wherein the interaction of these positive-locking elements prevents a rotation of the ring element 8 relative to the fitting base 9. Positive-locking connections are created by the engagement of the connection partners. In the case of FIG. 2, element 8.2 is designed as a "tongue" and element 9.3 as a "groove." The reverse variant is possible, also other positive-locking options are within the scope of the present disclosure.

Furthermore, the ring element 8 comprises a second positive-locking element 8.3 on the inner side, and the cable 10 comprises a complementary positive-locking element 10.1, wherein the interaction of these positive-locking elements prevents a rotation of the cable 10 relative to the ring element 8. In this case, element 8.3 is designed as a "groove" and element 9.3 as a "tongue." The reverse variant is possible, also other positive-locking options. If the cable 10 comprises protruding labels, they can be used as "tongues." The "groove" in this case is approximately 0.3 mm to 1 mm deep, for example, 0.5 mm.

The fitting base 9 and the fitting tube 2 each comprise connecting means, in this case the threads 13, 14, in order to releasably connect them to one another.

The fitting tube 2, the protective basket 4 and the fitting base 9 consist of a plastic material having a density of greater than 1 g/cm$^3$, for example, a polyoxymethylene. Likewise, the ring element 8 and the crown nut 7 can be manufactured of this material. An alternative is stainless steel.

In order to assemble a modular fitting 1 as described above, the following method steps are performed:

slipping the ring element 8 over the cable 10;

passing the cable 10 through the fitting base 9 and inserting the ring element 8 into the fitting base 9;

inserting the crown nut 7 into the fitting base 9 and screwing it down until the ring element 8 abuts and seats against the stop 9.2 of the fitting base 9;

connecting the sensor 2 to the cable 10; and connecting the fitting tube 2 to the fitting base 9.

The invention claimed is:

1. A modular fitting for immersion in a medium, the fitting comprising:

a hollow, cylindrical fitting tube configured to accommodate a sensor so as to enable a sensor to contact the medium via a sensitive element at a first end region of the fitting tube, wherein the fitting tube comprises a protective basket, which includes at least two tines at the first end region;

a crown nut including an external thread and at least two slots;

a ring element; and a hollow, cylindrical fitting base including an internal thread on a first end region of the fitting base and a stop at a second end region of the fitting base, wherein the internal thread is complementary to the external thread of the crown nut, wherein the ring element is configured to be introduced over an end region of a cable, wherein the cable is connectable to the sensor, wherein the fitting base is configured to accommodate the ring element and to fix the ring element with the crown nut, and wherein the fitting base and the fitting tube each include a first connection to enable each to releasably connect to the other.

2. The fitting according to claim 1, further comprising the sensor.

3. The fitting according to claim 1, further comprising the cable.

4. The fitting according to claim 1, wherein the ring element includes an axial slot.

5. The fitting according to claim 1, wherein the ring element includes a first positive-locking element, and the fitting base includes a base positive-locking element complementary thereto, and wherein the first positive-locking element and the base positive-locking element are configured to prevent a rotation of the ring element relative to the fitting base.

6. The fitting according to claim 1, wherein the ring element includes a second positive-locking element and the cable includes a complementary cable positive-locking element, and wherein the second positive-locking element and the cable positive-locking element are configured to prevent the cable from rotating relative to the ring element.

7. The fitting according to claim 1, wherein the fitting tube includes one or more openings at the first end region.

8. The fitting according to claim 1, wherein the at least two tines of the fitting tube and the at least two slots of the crown nut are adapted correspondingly so as to enable the crown nut to be installed into the fitting base via the at least two tines using the fitting tube.

9. The fitting according to claim 1, wherein the fitting tube is configured in a first part and a second part, which each include a second connection adapted to releasably connect to each other.

10. The fitting according to claim 9, wherein the fitting tube includes a seal in an interior thereof which, when the sensor is installed in assembly, encloses the sensor and prevents medium from entering the interior of the fitting tube, and wherein the protective basket is arranged in the first part, and the seal is arranged in the second part.

11. The fitting according to claim 9, wherein the second connection of the first part and the second part of the fitting tube comprises threads.

12. The fitting according to claim 1, wherein the fitting tube includes a seal in an interior of the fitting tube which, when the sensor is installed in assembly, encircles the sensor and prevents the medium from entering the interior of the fitting tube.

13. The fitting according to claim 1, wherein the at least two tines of the protective basket include four, five or six tines.

14. The fitting according to claim 1, wherein the at least two slots of the crown nut include four, five or six slots.

15. The fitting according to claim 1, wherein the first connection of the fitting base and the fitting tube comprises threads.

16. The fitting according to claim 1, wherein the fitting base includes one or more bores or eyelets in a region of the stop.

17. A method for assembling a fitting according to claim 1, the method comprising:

introducing the ring element over the cable;

passing the cable through the fitting base;

inserting the ring element into the fitting base;

inserting the crown nut into the fitting base and rotating the crown nut until the ring element abuts the stop of the fitting base;

connecting the sensor to the cable; and connecting the fitting tube to the fitting base.

* * * * *